United States Patent
Lee et al.

(10) Patent No.: US 8,393,768 B2
(45) Date of Patent: Mar. 12, 2013

(54) SIDE-ILLUMINATING PROJECTION LAMP AND HEADLIGHT HAVING THE SAME

(75) Inventors: Kyung Soo Lee, Gyeongsan-si (KR);
Dae Kon Kim, Gyeongsan-si (KR);
Byung Kyu Yoon, Ansan-si (KR);
Kwang Min Ko, Hwaseong-si (KR)

(73) Assignees: Hyundai Motor Company, Seoul (KR);
SL Lighting Corporation, Daegu (KR)

( * ) Notice: Subject to any disclaimer, the term of this patent is extended or adjusted under 35 U.S.C. 154(b) by 348 days.

(21) Appl. No.: 12/818,991

(22) Filed: Jun. 18, 2010

(65) Prior Publication Data
US 2011/0080752 A1   Apr. 7, 2011

(30) Foreign Application Priority Data
Oct. 1, 2009 (KR) .................. 10-2009-0093835

(51) Int. Cl.
*B60Q 1/00* (2006.01)

(52) U.S. Cl. ........ 362/538; 362/507; 362/520; 362/545; 362/555

(58) Field of Classification Search .................. 362/538, 362/507, 520, 543, 544, 545, 555
See application file for complete search history.

(56) References Cited

U.S. PATENT DOCUMENTS

| | | | | |
|---|---|---|---|---|
| 5,353,204 A * | 10/1994 | Kawamura | .................... | 362/538 |
| 6,837,605 B2 * | 1/2005 | Reill | .............................. | 362/555 |
| 6,955,439 B2 | 10/2005 | Reismiller et al. | | |
| 7,445,366 B2 * | 11/2008 | Tsukamoto et al. | .......... | 362/538 |
| 7,618,163 B2 * | 11/2009 | Wilcox | ......................... | 362/336 |
| 7,766,509 B1 * | 8/2010 | Laporte | .................... | 362/249.02 |
| 2003/0107901 A1 * | 6/2003 | Tokoro et al. | ................. | 362/538 |
| 2005/0190572 A1 * | 9/2005 | Komatsu et al. | ............. | 362/538 |
| 2007/0019428 A1 * | 1/2007 | Tsukamoto et al. | .......... | 362/509 |
| 2009/0213608 A1 * | 8/2009 | Mozaffari-Afshar et al. | ............................ | 362/520 |

FOREIGN PATENT DOCUMENTS

| | | |
|---|---|---|
| JP | 4-269401 A | 9/1992 |
| JP | 2006-100131 A | 4/2006 |
| JP | 2008-27650 A | 2/2008 |
| KR | 10-0824912 B1 | 4/2008 |

* cited by examiner

*Primary Examiner* — Mary Ellen Bowman
(74) *Attorney, Agent, or Firm* — Morgan, Lewis & Bockius LLP

(57) ABSTRACT

A side-illuminating projection lens and a headlight having the same, in which a side-illuminating lamp is implemented with a projection lamp that illuminates to the side of a vehicle by radiating light in the radial direction, wherein sideways-radiated light is projected in the radial direction and is thus smoothly combined with forward-radiated light, thereby improving the driver's vision.

16 Claims, 8 Drawing Sheets

(a)

(b)

SIDE-ILLUMINATING PROJECTION LAMP AND HEADLIGHT HAVING THE SAME

CROSS REFERENCE TO RELATED APPLICATION

The present application claims priority to Korean Patent Application Number 10-2009-0093835 filed on Oct. 1, 2009, the entire contents of which application is incorporated herein for all purposes by this reference.

BACKGROUND OF THE INVENTION

1. Field of the Invention

The present invention relates to a side-illuminating projection lens and a headlight having the same, and more particularly, to a side-illuminating projection lens and a headlight having the same, in which a side-illuminating lamp is implemented with a projection lamp that illuminates to the side of a vehicle by radiating light in the radial direction so that sideways-radiated light overlaps forward-radiated light, thereby improving the driver's vision.

2. Description of Related Art

In general, vehicle headlights are fixed to a headlight housing of a vehicle to illuminate the road only in the direction coaxial with the longitudinal line of the vehicle. Therefore, the driver's vision is limited to objects in the forward direction. Since objects to the sides are seldom perceptible, the driver can be subjected to a dangerous situation.

Accordingly, low-beam headlights equipped with side-illuminating lamps have been proposed in the related art in order to solve this problem.

Below, with reference to FIGS. 1A to 1C, a description will be given of a low-beam headlight equipped with a side-illuminating lamp of the related art.

FIG. 1A is a front elevation view showing a low-beam headlight equipped with a side-illuminating lamp of the related art, FIG. 1B is front elevation and perspective views showing a projection lens of the related art, and FIG. 1C is a front elevation view showing the state of the projection lens when it radiates light to the side.

The low-beam headlight 1 equipped with a side-illuminating lamp of the related art includes front-illuminating lamps 2, in which projection lamps are used, and side-illuminating lamps 3, each of which is implemented with a Multi-Focal Reflector (MFR) lamp.

Each of the front-illuminating lamps 2 is configured to radiate light from a light source 20 in the forward direction through a projection lens 10 (see FIG. 1B). Each of the side-illuminating lamps 3 is configured to radiate light from a light source 20 to the side using a reflector 30.

The front-illuminating lamp 2 including the projection lens has a good aesthetic appearance since its interior is not exposed to the outside. In contrast, the side-illuminating lamp 3, implemented with an MFR lamp, does not have a good aesthetic appearance since its interior configuration is exposed to the outside. Since the front-illuminating lamps 2 and the side-illuminating lamps 3 have different designs, the layout of the headlight 1 is complicated and the beauty of design of the headlight 1 is inferior.

Meanwhile, as shown in FIG. 1C, the side-illuminating lamp 3 can be constructed to incorporate a projection lens 10 by angling the projection lens 10 to one side. However, the projection lens 10 has a flat underside 12 and a convex upper surface 11 opposite the underside 12 to provide parallel light rays. Accordingly, a dark zone 7, which is illuminated neither by the forward-radiated light nor the sideways-radiated light, is formed, thereby degrading the driver's vision.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a headlight, in which a front-illuminating lamp and a side-illuminating lamp have the same shape, thereby improving the freedom of layout and aesthetic appearance and to provide a side-illuminating projection lens for the side-illuminating lamp, which illuminates to the side of a vehicle by radiating light in the radial direction so that sideways-radiated light overlaps forward-radiated light, thereby improving the driver's vision.

In an aspect of the present invention, the side-illuminating projection lens, may include a convex surface, through which light exits the projection lens, and an underside including a refracting surface, through which light enters the projection lens, wherein the underside is angled with respect to an imaginary plane defined by an outer circumference of the convex surface and the refracting surface is curved in toward the convex surface.

A center of the refracting surface may be located in an area included by an obtuse angle between a center line of the convex surface and a bottom line of the underside, and wherein the center line of the convex surface is an imaginary line passing through an outermost point and a center of the convex surface.

The distance between the convex surface and the underside, including the refracting surface, may increase in one direction and a cut surface may be formed in one side portion thereof, in which the distance between the convex surface and the underside is greater than that in an opposite portion.

In another aspect of the present invention, the side-illuminating projection lens, may include a convex surface, through which light exits the projection lens, and an underside including a refracting surface, through which light enters the projection lens, the refracting surface being curved in toward the convex surface, wherein foci of the convex surface and the refracting surface are disposed at different locations, wherein an included angle between a center line of the convex surface and a center line of the refracting surface is an acute angle.

The focus of the convex surface may be disposed closer to the underside than the focus of the refracting surface is.

A light source may be disposed between the foci of the convex surface and the refracting surface.

A center of light in a light source may be directed along the center line of the refracting surface.

The distance between the convex surface and the refracting surface may increase in one direction to form a thin portion and a thick portion such that the focus of the refracting surface is aligned toward the thin portion, wherein a cut surface is formed in the thick portion of the projection lens, wherein the cut surface is formed in a shape corresponding to an inner surface of a housing to receive the projection lens therein.

In further another aspect of the present invention, a headlight, may include a first lamp illuminating in a forward direction of a vehicle or in a downward direction thereof, a second lamp illuminating to a side of the vehicle, and housings, wherein the first and second lamps are fixedly coupled to the respective housings, wherein the second lamp comprises:

a side-illuminating projection lens including a convex surface, through which light exits the projection lens, and an underside, through which light enters the projection lens, wherein the underside is angled with respect to an imaginary plane defined by an outer circumference of the convex surface, and has a refracting surface curved in toward the convex surface, and a light source located at a position spaced apart from the underside of the projection lens, wherein a center of the refracting surface of the projection lens is located in an area included by an obtuse angle between a center line of the convex surface and a bottom line of the underside of the projection lens, the center line of the convex surface being an imaginary line passing through an outermost point and a center of the convex surface, and wherein the light source is located adjacent to the side-illuminating projection lens, toward the underside at a distance shorter than a center of the convex curve.

A center line of the first lamp and a center line of the convex surface of the side-illuminating projection lens may be substantially in parallel.

According to various aspects of the present invention as set forth above, sideways-radiated light is projected in the radial direction and is thus smoothly combined with forward-radiated light, thereby improving the driver's vision. Since the front-illuminating lamps and the side-illuminating lamp have the same shape, the freedom of layout is improved and the aesthetic appearance is excellent.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1A:
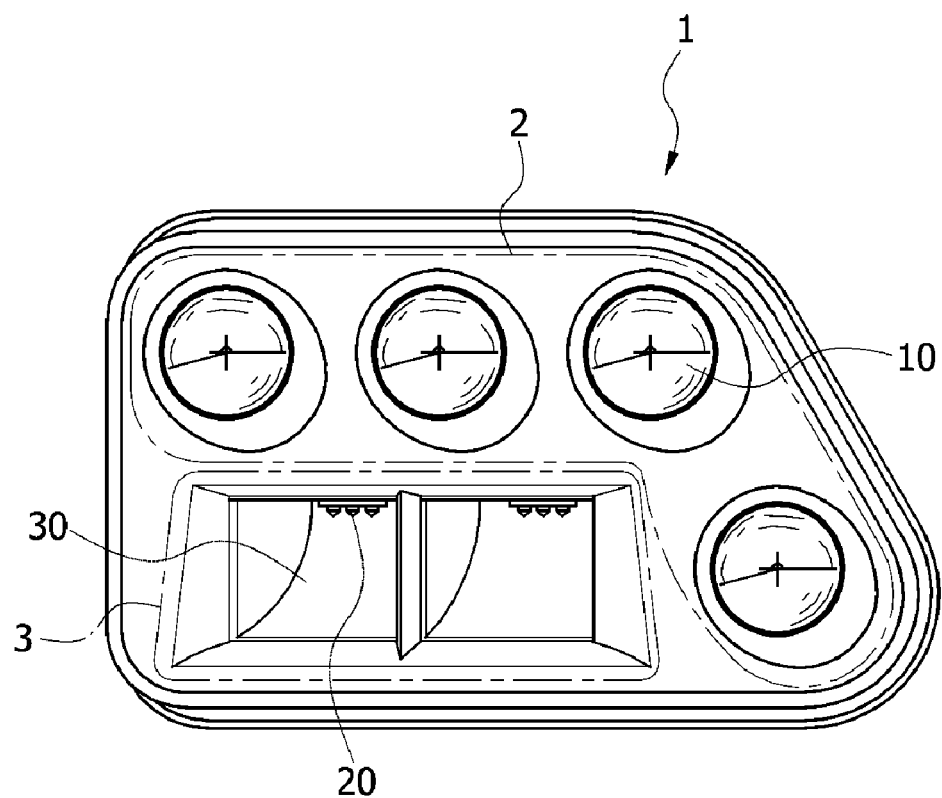
FIG. 1A is a front elevation view showing a low-beam headlight equipped with a side-illuminating lamp of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
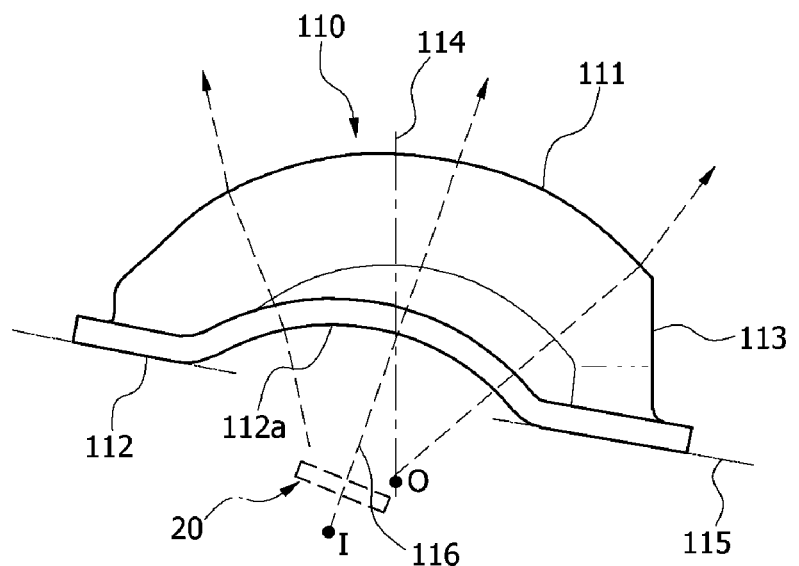
FIG. 2 is front elevation and perspective views showing an exemplary side-illuminating projection lens according to the present invention.
Figure 2:
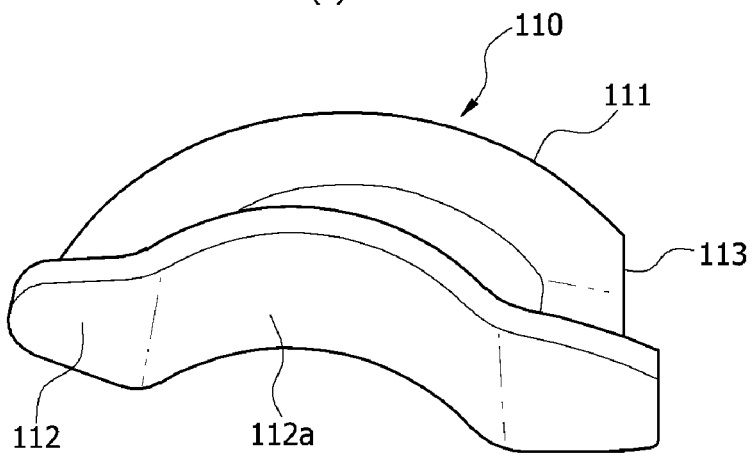

FIG. 2 is front elevation and perspective views showing a side-illuminating projection lens 110 according to an exemplary embodiment of the present invention.

The side-illuminating projection lens 110 has a key feature that allows light to spread in the radial direction. In order to realize this feature, the side-illuminating projection lens 110 includes a convex surface 111, through which light exits the projection lens 110, and an underside 112, through which light enters the projection lens 110. The underside 112 is angled with respect to an imaginary plane defined by the outer circumference of the convex surface 111. The underside 112 has an arc-shaped refracting surface 112a, which is curved in toward the convex surface 111.

The convex surface 111 is formed in the same shape as is known in the art. In contrast, the underside 112 is located opposite the convex surface 111 and is angled with respect to the imaginary plane defined by the outer circumference of the convex surface 111. In the underside 112, the arc-shaped refracting surface 112a is curved in toward the convex surface 111. The center I of the refracting surface 112a is at a different location from the center O of the convex surface 111. A center line 116 of the refracting surface 112a may be defined as an imaginary line passing through the apex (i.e., the innermost point) and the center I of the refracting surface 112a.

The center I of the refracting surface 112a is located in an area included by an obtuse angle between the center line 114 of the convex surface 111 and the bottom line 115 of the underside 112. The center line 114 of the convex surface 111 is an imaginary line passing through the apex (i.e., the outermost point) and the center O of the convex surface 111. Accordingly, the thickness of the side-illuminating projection lens 110, more particularly, the distance between the convex surface 111 and the underside 112, including the refracting surface 112a, increases in one direction (i.e., toward a cut surface 113).

In other words, the apex of the convex surface 111 is directed forward, and the apex (i.e., the innermost point) of the refracting surface 112a is located to one side with respect to the apex of the convex surface 111 such that the center lines 114 and 116 are not in parallel each other but form an acute angle therebetween.

Accordingly, the side-illuminating projection lens 110 is configured so that the convex surface 111, exposed to the outside, appears the same as that of a conventional projection lens. The refracting surface 112a causes the thickness of the side-illuminating projection lens 110 to decrease and the focal length of the lens 110 to be spaced further apart from the underside 112.

Accordingly, light exiting the convex surface 111 can spread in the radial direction while being radiated to the side. Preferably, a light source can be provided adjacent to the side-illuminating projection lens 110, at a distance shorter than the focal length of the side-illuminating projection lens 110. In addition, it is preferable that the thickness of the side-illuminating projection lens 110 be determined to ensure that the inner structure of the side-illuminating projection lens 110 is not exposed to the outside.

In addition, the side-illuminating projection lens 110 can be configured to minimize the refraction of light rays that are directed toward the convex surface 111 through the refracting surface 112a and the refraction of light rays that exit through the convex surface. Although the refracting surface 112a and the convex surface 111 are aspheric in this embodiment, they can be formed to be spherical.

Figure 3:
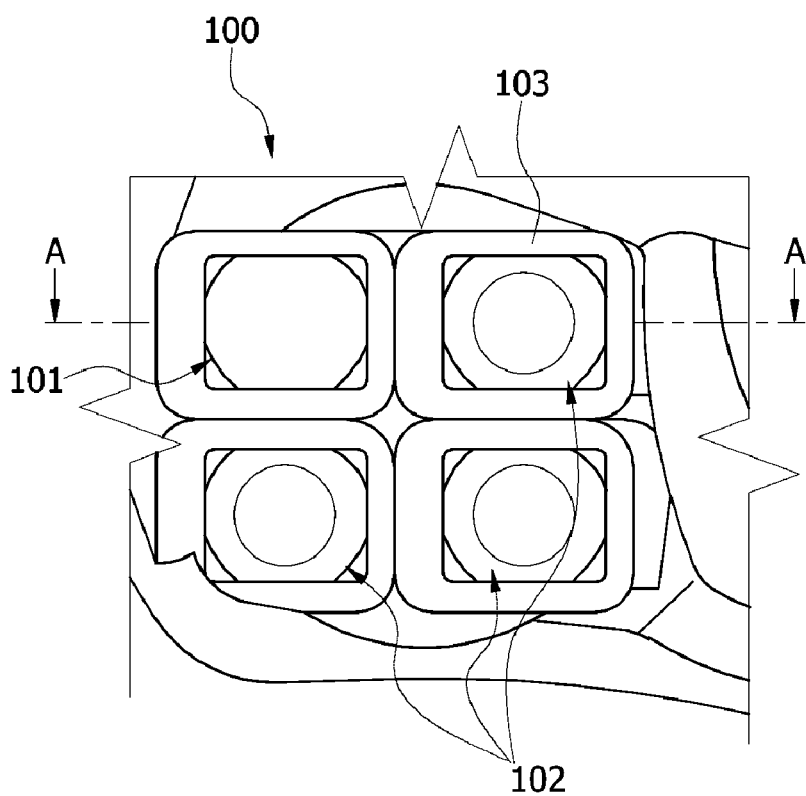
FIG. 3 is a front elevation view showing a headlight mounted with an exemplary side-illuminating projection lens according to the present invention.
Figure 4:
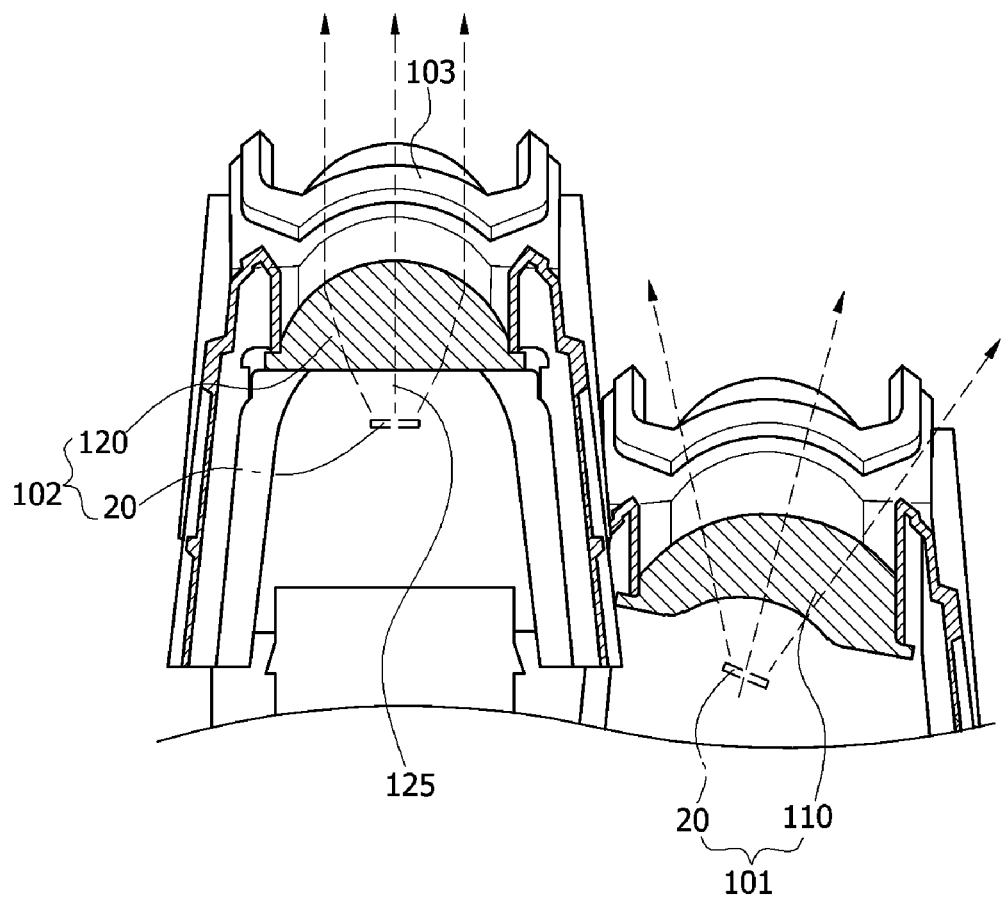
FIG. 4 is a schematic cross-sectional view taken along line A-A in FIG. 3.

FIG. 3 is a front elevation view showing a headlight 100 mounted with a side-illuminating projection lens according to an exemplary embodiment of the present invention, and FIG. 4 is a schematic cross-sectional view taken along line A-A in FIG. 3.

The headlight 100 mounted with a side-illuminating projection lens according to an exemplary embodiment of the present invention includes front-illuminating lamps 102 and a side-illuminating lamp 101. The front-illuminating lamps 102 are mounted on either side of the front of a vehicle to radiate light ahead of the vehicle in a downward direction. The side-illuminating lamp 101 is configured to illuminate to the side of the vehicle. The front-illuminating lamps 102 and the side-illuminating lamp 101 are mounted in respective lamp housings 103.

Figure 1B:
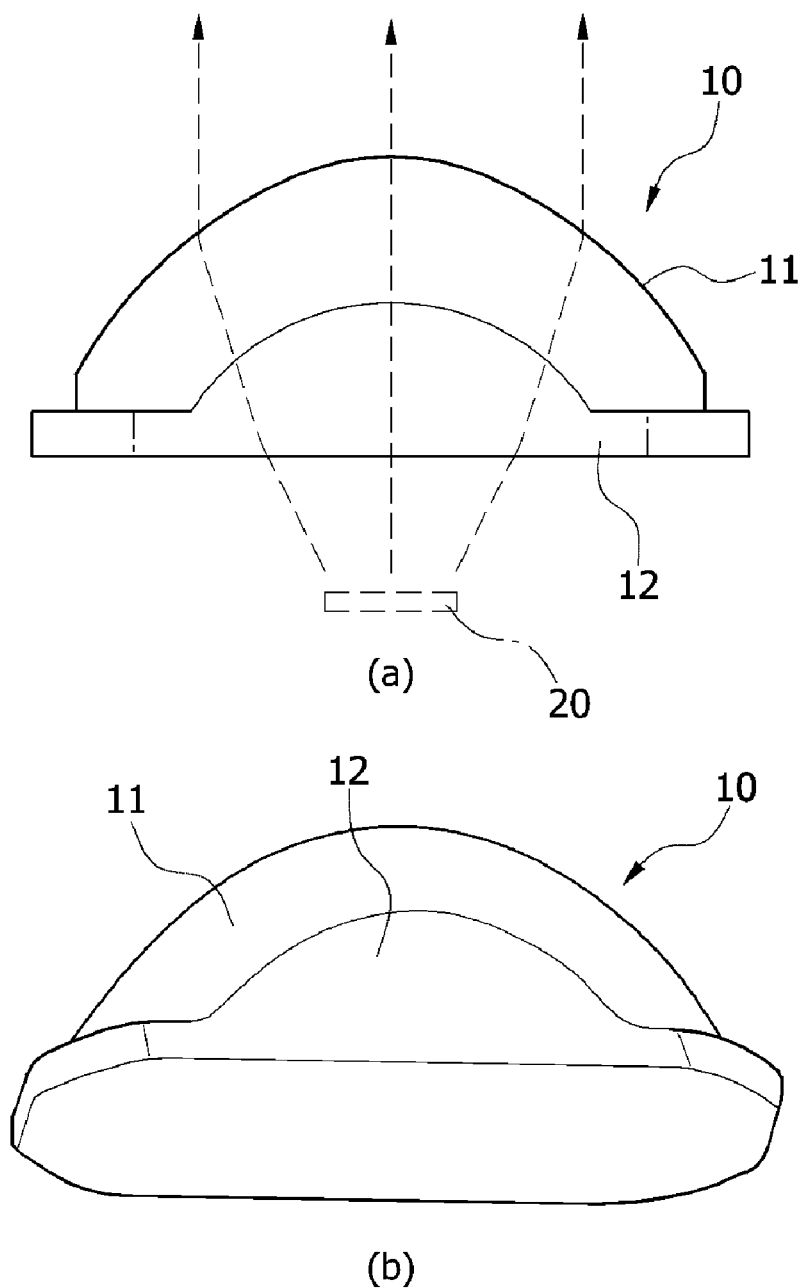
FIG. 1B is front elevation and perspective views showing a projection lens of the related art.
Figure 1C:
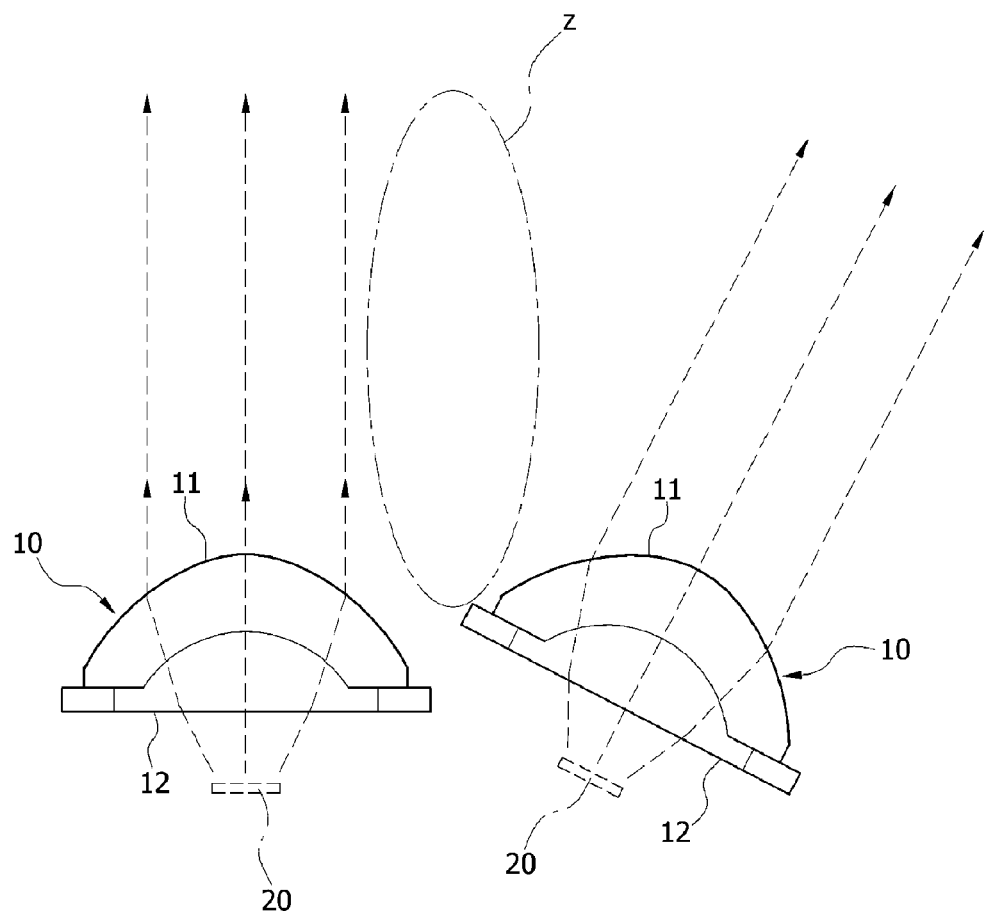
FIG. 1C is a front elevation view showing the state of the projection lens when it radiates light to the side.

All of the front-illuminating lamps 102 and the side-illuminating lamp 101 are of a projection lamp type. The front-illuminating lamps 102 use a typical projection lens 120, as previously shown in FIG. 1B. Specifically, each of the front-illuminating lamps 102 includes a projection lens 120 having a convex surface, through which light exits the projection lens 120, and a flat underside, through which light enters the projection lens 120. The front-illuminating lamp 102 also includes a light source 20, which is located at a position spaced apart from the underside of the projection lens 120 to radiate light toward the projection lens 120.

The side-illuminating lamp 101 includes a side-illuminating projection lens 110 as shown in FIG. 2. When assembled to the lamp housings 103, the center line 114 of the convex surface 111 of the side-illuminating projection lens 110 and the center line 125 of the convex surfaces of the front-illuminating projection lenses 120 may be oriented in the same direction. Accordingly, the front-illuminating lamps 102 and the side-illuminating lamp 101 can appear the same when viewed from outside.

Preferably, in the side-illuminating projection lens 110, the cut surface 113 can be formed by cutting one side portion of the convex surface 111 in a shape corresponding to the inner surface of the lamp housing 103, thereby facilitating coupling with the lamp housing 103. The cut surface 113 is planar so that it can come into contact with the inner surface of the lamp housing 103, since the cross section of the lamp housing 103 is rectangular in this embodiment. However, the cut surface 113 can have a variety of shapes depending on the shape of the lamp housing 103.

The side-illuminating lamp 101 also includes a light source 20 that is spaced apart from the underside of the side-illuminating projection lens 110, at a distance shorter than the focal length of the side-illuminating projection lens 110. Preferably, the light source 20 can be located in such a manner that the center of light emitted therefrom is directed toward the apex of the refracting surface 112a.

Preferably, the light source 20 used in the side- and front-illuminating projection lenses 101 and 102 can be implemented using highly directional Light Emitting Diodes (LEDs). Although not shown, a reflector can be provided behind the light source 20 in order to direct more light toward the lens.

In addition, the thickness of the side-illuminating projection lens 110 increases in the direction away from the front-illuminating lamps 102.

In this configuration, through a thin portion, the side-illuminating lamp 101 radiates light to the side of the vehicle in the radial direction so that the sideways-radiated light smoothly overlaps the forward-radiated light and through a thicker portion, the path of the light rays reaching the convex surface 111 is increased, thereby refracting the light rays toward the underside 112 when they exit the lens 110. As a result, exiting light can be more widely spread in the radial direction.

The lamp housings 103 are formed to have the same shape. The lamp housings 103 have an opening in the front portion such that only the projection lenses 110 and 120 of the side- and front-illuminating lamps 101 and 102 can be exposed to the outside. Preferably, two or more lamp housings 103 can be provided. The side- and front-illuminating lamps 101 and 102 are fixedly mounted on the lamp housings 103.

In this embodiment, four lamp housings 103, three front-illuminating lamps 102, and one side-illuminating lamp 101 are provided. Preferably, the side-illuminating lamp 101 can be located in one of the upper lamp housings, which is transversely oriented.

In the above described configuration, when light is emitted from the light source, the front-illuminating lamps 102 radiate light directly ahead of the vehicle, and the side-illuminating lamp 101 radiates light to the side of the vehicle in the radial direction so that the sideways-radiated light smoothly overlaps the forward-radiated light, thereby improving the driver's vision.

Figure 5:
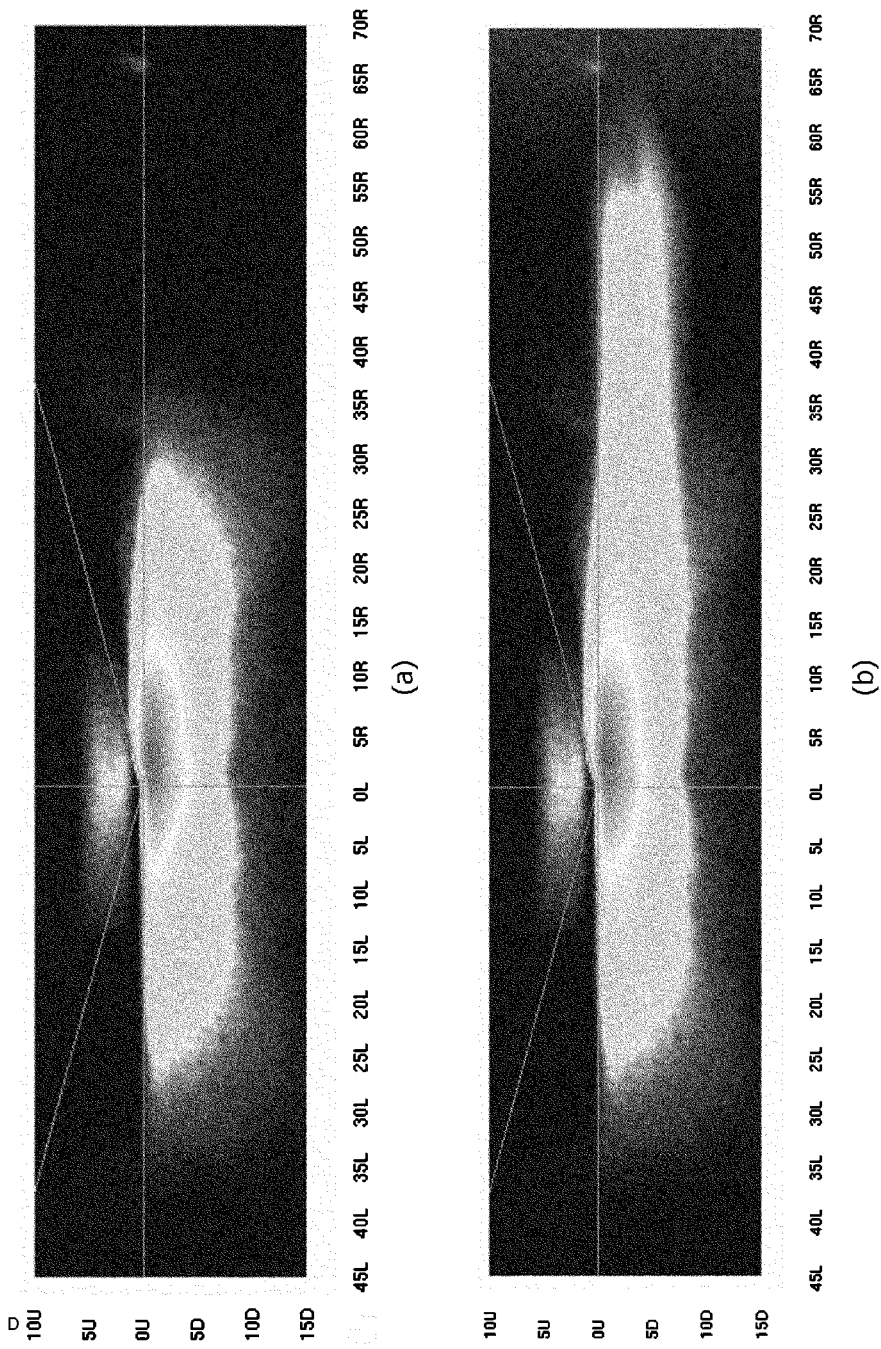
FIG. 5 is pictures showing the distribution pattern of light radiated on a screen and a road surface when a headlight mounted with an exemplary side-illuminating projection lens according to the present invention is turned on/off.
Figure 6:
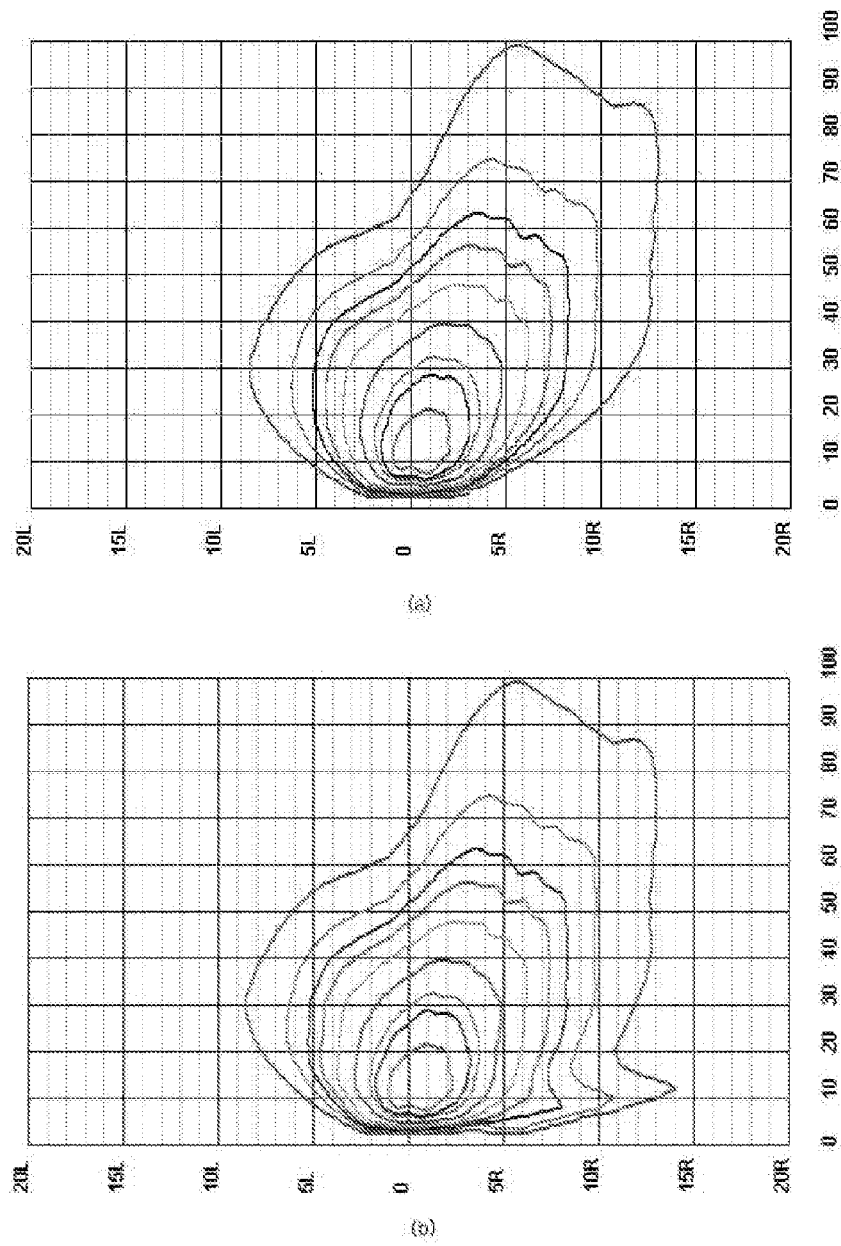
FIG. 6 is graphs showing the distribution pattern of light radiated on a screen and a road surface when a headlight mounted with an exemplary side-illuminating projection lens according to the present invention is turned on/off.

FIGS. 5 and 6 are pictures and graphs showing the distribution pattern of light radiated on a screen and a road surface when a headlight mounted with a side-illuminating projection lens according to an exemplary embodiment of the present invention is turned on/off.

As shown in part (a) of FIG. 5 and part (a) of FIG. 6, when only the front-illuminating lamp is turned on, it was observed that the distribution of radiated light was substantially equal in the transverse direction. In contrast, as shown in part (b) of FIG. 5 and part (b) of FIG. 6, when the front- and side-illuminating lamps are turned on, it was observed that the distribution of radiated light was widely spread in one direction with respect to the center.

In addition, the forward-radiated light from the front-illuminating lamp and the sideways-radiated light from the side-illuminating lamp are smoothly mixed with each other without the occurrence of interference therebetween, thereby improving the driver's vision.

For convenience in explanation and accurate definition in the appended claims, the term "upper" or "bottom" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side-illuminating projection lens, comprising:
a convex surface, through which light exits the projection lens, and
an underside including a refracting surface, through which light enters the projection lens,
wherein the underside is angled with respect to an imaginary plane defined by an outer circumference of the convex surface and the refracting surface is curved in toward the convex surface, and
wherein the distance between the convex surface and the underside, including the refracting surface, increases in one direction.

2. The side-illuminating projection lens according to claim 1, wherein a center of the refracting surface is located in an area included by an obtuse angle between a center line of the convex surface and a bottom line of the underside, and wherein the center line of the convex surface is an imaginary line passing through an outermost point and a center of the convex surface.

3. The side-illuminating projection lens according to claim 1, further comprising a cut surface in one side portion thereof, in which the distance between the convex surface and the underside is greater than that in an opposite portion.

4. A side-illuminating projection lens, comprising:
a convex surface, through which light exits the projection lens; and
an underside including a refracting surface through which light enters the projection lens, the refracting surface being curved in toward the convex surface;
wherein foci of the convex surface and the refracting surface are disposed at different locations; and
wherein the distance between the convex surface and the refracting surface increases in one direction to form a thin portion and a thick portion such that the focus of the refracting surface is aligned toward the thin portion.

5. The side-illuminating projection lens according to claim 4, wherein an included angle between a center line of the convex surface and a center line of the refracting surface is an acute angle.

6. The side-illuminating projection lens according to claim 5, wherein the focus of the convex surface is disposed closer to the underside than the focus of the refracting surface is.

7. The side-illuminating projection lens according to claim 5, wherein a light source is disposed between the foci of the convex surface and the refracting surface.

8. The headlight according to claim 5, wherein a center of light in a light source is directed along the center line of the refracting surface.

9. The side-illuminating projection lens according to claim 4, wherein a cut surface is formed in the thick portion of the projection lens, wherein the cut surface is formed in a shape corresponding to an inner surface of a housing to receive the projection lens therein.

10. A headlight, comprising:
a first lamp illuminating in a forward direction of a vehicle or in a downward direction thereof;
a second lamp illuminating to a side of the vehicle; and
housings, wherein the first and second lamps are fixedly coupled to the respective housings,
wherein the second lamp comprises:
a side-illuminating projection lens including a convex surface, through which light exits the projection lens, and an underside, through which light enters the projection lens, wherein the underside is angled with respect to an imaginary plane defined by an outer circumference of the convex surface, and has a refracting surface curved in toward the convex surface; and
a light source located at a position spaced apart from the underside of the projection lens; and
wherein a center line of the first lamp and a center line of the convex surface of the side-illuminating projection lens are substantially in parallel.

11. The headlight according to claim 10,
wherein a center of the refracting surface of the projection lens is located in an area included by an obtuse angle between a center line of the convex surface and a bottom line of the underside of the projection lens, the center line of the convex surface being an imaginary line passing through an outermost point and a center of the convex surface, and
wherein the light source is located adjacent to the side-illuminating projection lens, toward the underside at a distance shorter than a center of the convex curve.

12. The side-illuminating projection lens according to claim 10, wherein an included angle between center lines of the convex surface and the refracting surface is an acute angle.

13. The side-illuminating projection lens according to claim 10, wherein a light source is disposed between focus of the convex surface and focus of the refracting surface.

14. The headlight according to claim 10, wherein a center of light in a light source is directed along a center line of the refracting surface.

15. The headlight according to claim 10, wherein a thickness between the convex surface and the refracting surface of the side-illuminating projection lens increases in a direction away from the first lamp to form a thin portion and a thick portion.

16. The headlight according to claim 15, wherein the side-illuminating projection lens has a cut surface in the thick portion of the convex surface, corresponding to an inner portion of one of the lamp housings on which the second lamp is mounted.

* * * * *